US008607153B2

(12) United States Patent
Kramer

(10) Patent No.: US 8,607,153 B2
(45) Date of Patent: Dec. 10, 2013

(54) GRAPHIC FOR DISPLAYING MULTIPLE ASSESSMENTS OF CRITICAL CARE PERFORMANCE

(75) Inventor: Andrew A. Kramer, Leesburg, VA (US)

(73) Assignee: Cerner Innovation, Inc., Kansas City, KS (US)

( * ) Notice: Subject to any disclaimer, the term of this patent is extended or adjusted under 35 U.S.C. 154(b) by 364 days.

(21) Appl. No.: 12/650,151

(22) Filed: Dec. 30, 2009

(65) Prior Publication Data

US 2011/0161857 A1 Jun. 30, 2011

(51) Int. Cl.
  *G06F 3/048* (2013.01)
  *G06T 11/20* (2006.01)
  *G06Q 10/00* (2012.01)
  *G06Q 50/00* (2012.01)

(52) U.S. Cl.
  USPC .............. 715/772; 345/440; 705/2; 705/3; 705/5; 715/808; 715/821

(58) Field of Classification Search
  USPC ..................... 705/2, 3, 5; 715/772
  See application file for complete search history.

(56) References Cited

U.S. PATENT DOCUMENTS

| 5,809,477 A * | 9/1998 | Pollack ........................... 705/3 |
| 5,812,983 A * | 9/1998 | Kumagai ........................ 705/3 |
| 2004/0167423 A1* | 8/2004 | Pillon et al. .................... 600/547 |
| 2007/0186187 A1* | 8/2007 | Strope et al. ................... 715/833 |

OTHER PUBLICATIONS

Nathanson, Brian H., et al., "A revised method to assess intensive care unit clinical performance and resource utilization," Critical Care Medicine, 2007, vol. 35, No. 8, pp. 1853-1862.
Rapoport, John, et al., "A method for assessing the clinical performance and cost-effectiveness of intensive care units: A multicenter inception cohort study," Critical Care Medicine, Sep. 1994, vol. 22, No. 9, pp. 1385-1391.
Higgins, Thomas L., et al., "Assessing Contemporary ICU Outcome: An Updated Mortality Probability Admission Models (MPM0-III)", Critical Care Medicine, 2007, vol. 35, No. 3, pp. 827-835.
Higgins, Thomas L., et al., "Prospective validation of intensive care unit admission Mortality Probability Model," Critical Care Medicine, 2009, vol. 37, vol. 5, pp. 1619-1623.

* cited by examiner

*Primary Examiner* — Boris Pesin
*Assistant Examiner* — Elizabeth G Wright
(74) *Attorney, Agent, or Firm* — Shook, Hardy & Bacon LLP

(57) ABSTRACT

Systems and methods for rendering a graphic that describes multiple dimensions of performance for a subject intensive care unit (ICU) over a predefined period of time are provided. One method involves measuring the performance of the subject ICU against various metrics and displaying the measured performance as a graphic constructed of data strips placed adjacent to a 2-dimensional plot. The lengths of the data strips visually represent a percentage of patients that did not receive active treatment in the subject ICU, a rate of readmission to an ICU, and a median of the acute physiological scores (APS's) extracted from patients admitted to the subject ICU, respectively. The 2-dimensional plot includes an X-axis that represents a ratio of a hospital predicted mortality rate value over the measured mortality rate, while a Y-axis represents a difference between a predicted mean length of stay value and the measured mean length of stay value.

18 Claims, 9 Drawing Sheets

GRAPHIC FOR DISPLAYING MULTIPLE ASSESSMENTS OF CRITICAL CARE PERFORMANCE

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Embodiments of the present invention relate to medical—industry tools that may be employed by service providers to facilitate tracking trends and/or evaluate performance of intensive care units (ICUs). Further, exemplary embodiments of the present invention provide systems and a methodology that generates and renders on a user interface (UI) display a graphic that simultaneously presents a number of key care or resource-use metrics. In an exemplary embodiment, the graphic reveals five dimensions of ICU performance that each provide a context for one another. These five dimensions of performance provide a snapshot of an ICU's current and past performance in an easy-to-modify and intuitive format that allows ICU managers and administrators to gauge ICU performance trends over time. Also, these five dimensions of performance enable ICU managers and administrators to comprehensively assess an ICU via broad range of performance measures that are interrelated. This results in a more robust evaluation of an ICU's performance.

By way of example, one or more of the five dimensions of performance may depict a comparison between a subject ICU's actual performance and a calculated benchmark of performance for a population of ICUs (e.g., predicted values). Use of these calculated benchmarks of performance, as opposed to simply comparing the subject ICU against the actual performance of other ICUs, provides a more accurate determination of whether the subject ICU is performing well or poorly. For instance, if the overall population of ICUs is underperforming, a direct comparison between measured performance of the subject ICU and other ICUs would provide a false indication that the subject ICU is producing acceptable outcomes and would fail to alert ICU managers and administrators that performance issues exist in the subject ICU. However, in the case where the overall population of ICUs is underperforming, a comparison between the subject ICU and the calculated benchmark of performance enables a hospital to judge how poorly the subject ICU is actually performing, and would likely prompt ICU managers and administrators to effect changes to policies or protocols that may result in higher operating efficiency and better resource allocation. Further, the division of the subject ICU's performance into five dimensions of performance allows the ICU managers and administrators to target specific aspects of the subject ICU that are causing inefficiencies.

A first aspect of an embodiment includes one or more computer-readable media accommodated by a computing device. Generally, the computer-readable media may support computer-useable instructions that, when executed, perform a method for producing a graphic that exposes a measured performance of a subject ICU. Initially, the method may include generating a 2-dimensional graph that includes an X-axis and a Y-axis. In one instance, the X-axis represents a first metric for evaluating operation of an ICU and the Y-axis represents a second metric for evaluating operation of an ICU. The method may further involve plotting a data point on the 2-dimensional graph at a location. This location visually indicates a performance, measured over a predefined period of time, of the subject ICU with respect to the first metric and the second metric. A first data strip that represents a third metric for evaluating operation of an ICU may be generated. In an exemplary embodiment, the length of the first data strip visually indicates a performance, measured over the predefined period of time, of the subject ICU with respect to the third metric.

Often, the first data strip and the 2-dimensional graph are interrelated. For instance, the location of the data point on the 2-dimensional plot may be directly affected by performance of the subject ICU measured against the third metric. The first data strip may be positioned adjacent to the 2-dimensional graph when rendered within the graphic on a UI display. This allows an ICU manager or administrator to simultaneously view performance measures that largely influence the overall operation of the subject ICU.

In a second aspect, embodiments are directed toward a computer system for automatically generating a graphic that facilitates assessment of a subject ICU with respect to a plurality of care-evaluation metrics. Initially, the computer system includes a processor coupled to a computer-readable medium that stores a plurality of computer software components executable by the processor. In an exemplary embodiment, the computer software components include an obtaining component, a predictive component, and a rendering component. The obtaining component is configured to obtain (access and/or measure) a mortality rate (hospital and/or ICU) of the subject ICU over a predefined period of time and to obtain a mean length of stay in the subject ICU over the predefined period of time. The predictive component is configured to perform a derivation process that calculates predicted values used for evaluating operation of the subject ICU. In one instance, the derivation process includes the following steps: generating a predicted value of a mortality rate utilizing historical medical records collected from a plurality of remote hospitals; and generating a predicted value of a length of stay in the subject ICU utilizing historical medical records collected from the plurality of remote hospitals. Typically, the mortality-rate predicted value represents a benchmark mortality rate, while the length-of-stay predicted value represents a benchmark duration of time an average patient stays in the subject ICU before being discharged. The rendering component is configured to construct a 2-dimensional graph that includes an X-axis and a Y-axis. The X-axis represents a ratio of the predicted mortality rate value over the measured mortality rate value and the Y-axis represents a difference between the predicted mean length of stay value and the measured mean length of stay value. The rendering component may be further configured to place at a location on the 2-dimensional graph a data point that visually indicates a performance of the subject ICU during the predefined period of time.

A further aspect of an embodiment takes the form of computer-readable media, with computer-executable instructions embodied thereon, that is capable of rending a UI display on one or more display devices. In general, the UI display is configured to present a graphic that provides an aggregate view of performance measurements for a subject ICU. In particular, the graphic may include four distinct display areas positioned in proximity to one another. The first display area includes a first data strip. The length of the first data strip by default visually represents a percentage of patients that did not receive active treatment upon being admitted to the subject ICU. The second display area includes a second data strip. The length of the second data strip by default visually represents a rate at which patients released from the subject ICU are readmitted to an ICU before discharge from the hospital. The third display area that includes a third data strip. The length of the third data strip by default visually represents a median of the acute physiological scores (APS's) calculated from each of the patients admitted to the subject ICU during a predefined period of time. And, the fourth display area that includes a 2-dimensional graph with an X-axis and a Y-axis. In an exemplary embodiment, increments on the X-axis signify a ratio of a predicted mortality rate value over the measured mortality rate value, while increments on the Y-axis signify a difference between a predicted mean length of stay value and the measured mean length of stay value. In general, the predicted mortality rate and the predicted length of stay are benchmark values derived from historical medical records produced by a plurality of remote hospitals. At least one data point is plotted on the 2-dimensional graph that visually indicates the subject ICU's measured performance over the predefined period of time. Accordingly, the graphic provides value to hospital staff by providing various concurrent and trended assessments of the ICU performance and by facilitating objective evaluation of the impact of particular metrics on the quality of critical care offered by the ICU.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Embodiments provide systems, methodologies, user interfaces (UI's), graphical user interfaces (GUI's), and computer-readable media for, among other things, presenting a graphic with interrelated metrics, or assessments, of measured intensive care unit (ICU) performance within respective display areas. Generally, the display areas include graphical objects, such as data points on 2-dimensional plots or data strips, that provide intuitive visual indications of how the ICU has recently or historically performed with respect to specific metrics. If desirous of additional information or targeted data pertaining to the ICU, ICU managers and administrators may change the specific metrics included in the graphic with others by carrying out a straightforward drop-down menu selection. Other graphical objects, such as pop-up graphs and directional arrows, may be included within the graphic to reveal details of a metric, trends related to the quality of critical care offered by the ICU, and historical information collected from the ICU over time. Accordingly, a broad spectrum of information is presented in a single view in the UI display, thereby assisting ICU managers and administrators to readily identify areas within the ICU that require the greatest amount of improvement.

Having briefly described embodiments of the present invention, an exemplary operating environment suitable for use in implementing embodiments of the present invention is described below.

Figure 1:
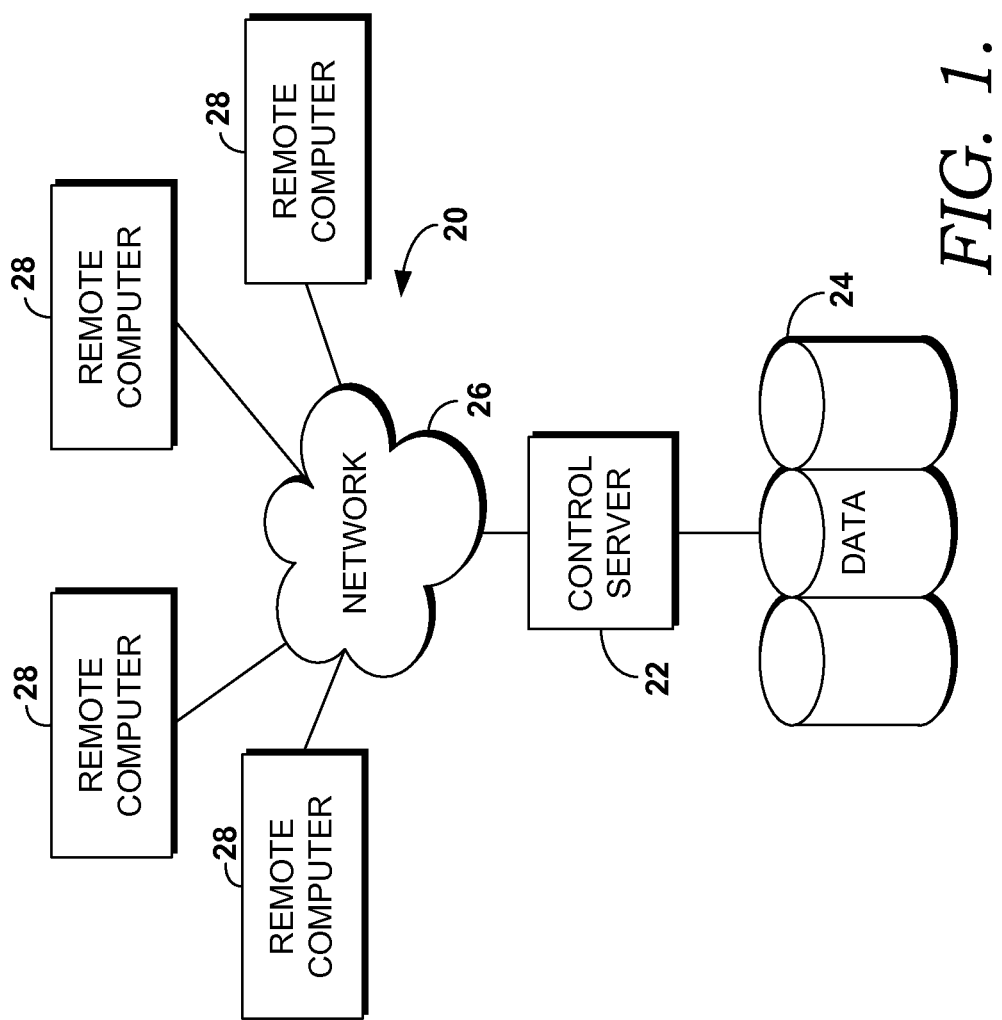
FIG. 1 is a block diagram of an exemplary computing environment suitable for use in implementing embodiments of the present invention.

Referring to the drawings in general, and initially to FIG. 1 in particular, an exemplary computing system environment, a medical information computing system environment, with which embodiments of the present invention may be implemented is illustrated and designated generally as reference numeral 20. It will be understood and appreciated by those of ordinary skill in the art that the illustrated medical information computing system environment 20 is merely an example of one suitable computing environment and is not intended to suggest any limitation as to the scope or functionality of the invention. Neither should the medical information computing system environment 20 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

With continued reference to FIG. 1, the exemplary medical information computing system environment 20 includes a general purpose computing device in the form of a control server 22. Components of the control server 22 may include, without limitation, a processing unit, internal system memory, and a suitable system bus for coupling various system components, including database cluster 24, with the control server 22. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 22 typically includes therein, or has access to, a variety of computer-readable media, for instance, database cluster 24. Computer-readable media can be any available media that may be accessed by server 22, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 22. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 24, provide storage of computer-readable instructions, data structures, program modules, and other data for the control server 22. The control server 22 may operate in a computer network 26 using logical connections to one or more remote computers 28. Remote computers 28 may be located at a variety of locations in a medical or research environment, for example, but not limited to, clinical laboratories (e.g., molecular diagnostic laboratories), hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, veterinarians, students, and the like. The remote computers 28 may also be physically located in non-traditional medical care environments so that the entire health care community may be capable of integration on the network. The remote computers 28 may be personal computers, servers, routers, network PCs, peer devices, other common network nodes, or the like, and may include some or all of the elements described above in relation to the control server 22. The devices can be personal digital assistants or other like devices.

Exemplary computer networks 26 may include, without limitation, local area networks (LANs) and/or wide area networks (WANs). Such networking environments are commonplace in offices, enterprise-wide computer networks, intranets, and the Internet. When utilized in a WAN networking environment, the control server 22 may include a modem or other means for establishing communications over the WAN, such as the Internet. In a networked environment, program modules or portions thereof may be stored in association with the control server 22, the database cluster 24, or any of the remote computers 28. For example, and not by way of limitation, various application programs may reside on the memory associated with any one or more of the remote computers 28. It will be appreciated by those of ordinary skill in the art that the network connections shown are exemplary and other means of establishing a communications link between the computers (e.g., control server 22 and remote computers 28) may be utilized.

In operation, a clinician, ICU manager, administrator, physician, or other hospital staff personnel may enter commands and information into the control server 22 or convey the commands and information to the control server 22 via one or more of the remote computers 28 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the control server 22. In addition to a monitor, the control server 22 and/or remote computers 28 may include other peripheral output devices, such as speakers and a printer.

Although many other internal components of the control server 22 and the remote computers 28 are not shown, those of ordinary skill in the art will appreciate that such components and their interconnection are well known. Accordingly, additional details concerning the internal construction of the control server 22 and the remote computers 28 are not further disclosed herein.

An exemplary system architecture 200 suitable for use in implementing embodiments of the present invention will now be discussed with reference to FIG. 2. Generally, the exemplary system architecture 200 provides a platform within a healthcare network for generating a multiple-assessment graphic for a subject ICU and for rending the graphic to a user (e.g., ICU manager or administrator). Further, the platform is used to manage operation of the subject ICU and to properly allocate resources (e.g., personnel, beds, and medical equipment) within the subject ICU.

Figure 2:
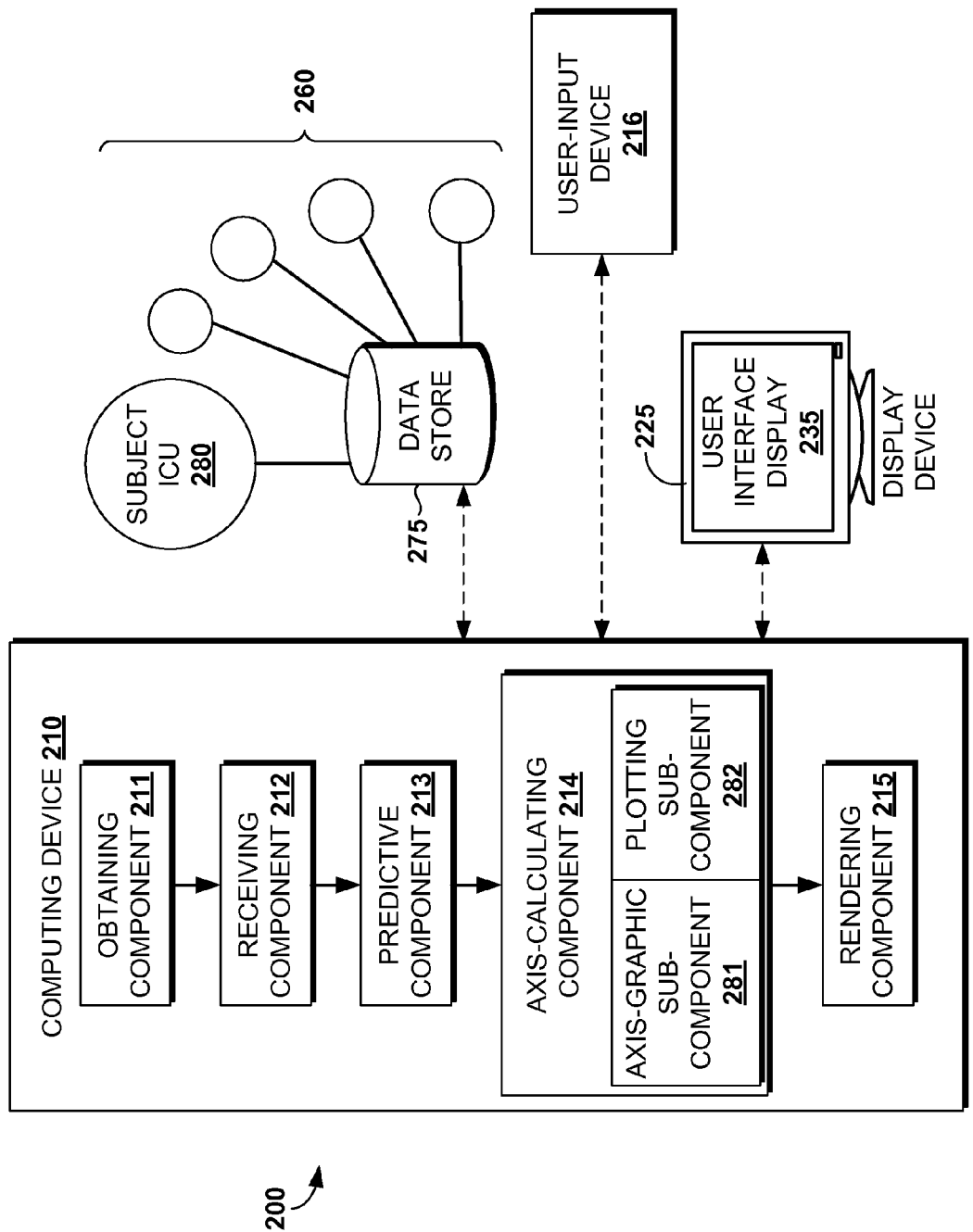
FIG. 2 is an exemplary system architecture suitable for use in implementing embodiments of the present invention.

It will be appreciated that the computing system architecture shown in FIG. 2 is merely an example of one suitable computing system and is not intended as having any dependency or requirement related to any single component or combination of components.

The exemplary system architecture 200 includes a variety of interconnected devices and software suitable for use in implementing embodiments of the present invention. Initially, in embodiments, the exemplary system architecture 200 includes a computing device 210, a user-input device 216, a display device 225, and a data store 275 that can access or store records from a subject ICU 280 and a plurality of other ICUs 260. In addition, computing device 210 accommodates computer-readable media that supports an obtaining component 211, a receiving component 212, a predictive component 213, an axis-calculating component 214, and a rendering component 215. It should be understood that this and other arrangements described herein are set forth only as examples. Other arrangements and elements (e.g., machines, interfaces, functions, orders, and groupings of functions, etc.) can be used in addition to, or instead of, those shown, and some elements may be omitted altogether. Further, many of the elements described herein are functional entities that may be implemented as discrete or distributed components or in conjunction with other components, and in any suitable combination and location. Even further, various functions described herein as being performed by one or more entities (e.g., devices, components, and the like) may be carried out by hardware, firmware, and/or software.

The user-input device 216 may comprise any of the input devices described above with reference to FIG. 1, such as a keyboard, a pointing device (commonly referred to as a mouse), a trackball, or a touchscreen. Generally, the user input device is configured to receive commands manually issued by a user and to submit those commands to the computing device 210. In embodiments, these commands may control the management of metrics or other performance-based information visually represented in the graphic, which is typically rendered at the display device 225. By way of example, a command issued by the user at the user-input device 216 may be an instruction to switch metrics within a display area of the graphic by selecting a new metric from a drop-down menu with a mouse click-action. As such, a user is provided one or more interactive devices to dynamically alter the information rendered within the graphic.

In embodiments, the display device 225 may be operably coupled to an output of the computing device 210, and may be configured as any presentation component that is capable of presenting information to a user, such as a digital monitor, electronic display panel, touch-screen, analog set top box, plasma screen, computer screen, projection device, or other hardware devices. In operation, the display device 225 is capable of displaying a UI display 235 that may present a graphic. Often the display device 225 is coupled to or integrated with a computer processor to facilitate presentation of the UI display 235. The UI display 235 may include a rendering of the graphic that presents information regarding a current status of a subject ICU. In addition, the UI display 235 may provide various graphical objects, or gadgets, within the graphic that provide a user with a multi-dimensional view of the performance of the subject ICU. Although depicted as being physically coupled to the computing device 210, the display device 225 may be remotely located therefrom, such as on a wall of the subject ICU. Further, although the display device 225 is illustrated as a single element, a plurality of display devices that each render UI displays are contemplated by embodiments of the present invention.

The data store 275 is generally configured to store, at a memory location, data generated and conveyed from the subject ICU 280, other ICUs 260 (e.g., established in other ICUs within the same hospital as well as ICUs in hospitals that are remote from the subject ICU 280), and the computing device 210. In addition, the data store 275 may be configured to be searchable for, or provide suitable access to, the data stored thereon. It will be understood and appreciated that the information stored in the data store 275 may be configurable and may include any information relevant to the methodology used to achieve proper execution of the system architecture 200. The content and volume of such information are not intended to limit the scope of embodiments of the present invention in any way. Further, though illustrated as a single, independent component, the data store 275 may, in fact, be a plurality of databases, for instance, a database cluster, portions of which may reside on one or more of the devices of the system architecture 200.

In various embodiments, the data stored at the data store 275 may include, without limitation, past and present measures of performance, with respect to predefined metrics, of the subject ICU 280 and/or a population of other ICUs 260, as well as other information that is corollary to and supportive of the performance measures. By way of example only, some of the performance measures that may be written to the data store include a percentage of patients that did not receive active treatment upon being admitted to the subject ICU 280, a rate at which patients released from the subject ICU 280 are readmitted to an ICU (e.g., the subject ICU 280 or one of the other ICUs 260) before discharge from the hospital, and a median of the acute physiological scores (APSs) calculated from each of the patients admitted to the subject ICU 280 during a predefined period of time. Other performance measures persisted in the data store 275 may include the following metrics: hospital/ICU mortality rate; and an observed, average length of ICU/hospital stay.

Although various different configurations of the data store 275 have been described, it should be understood and appreciated by those of ordinary skill in the art that other types of suitable devices that store historical medical records produced by a plurality of remote hospitals and/or ICU's other than the subject ICU 280 may be used, and that embodiments of the present invention are not limited to the information maintained in the data store 275 described herein. In a particular example, the individual-patient information may be automatically accessed and/or retrieved from electronic medical records (EMRs) associated with the patient(s).

In operation, the information in the data store 275 may be utilized to establish and update graphical objects that indicate performance of the subject ICU 280 measured against a plurality of metrics. As more fully discussed below, the information from the data store 275 may be dynamically retrieved by the obtaining component 211 and transferred to the predictive component 212 to generate predicted values for evaluating the subject ICU 280. The information, along with the predicted values, may then be processed at the rendering component 215 to generate the proper graphical objects that are presented within the graphic on the UI display 235.

The computing device 210, in practice, may be configured as distributed computing devices, such as servers in a cloud computing network. In another embodiment, the computing device 210 may be a stand-alone processing device, for example, computing device 22 described above with reference to FIG. 1. By way of example only and not limitation, the computing device 210 and/or the data store 211 may be a server, personal computer, desktop computer, laptop computer, handheld device, mobile handset, consumer electronic device, or the like. It should be noted, however, that embodiments are not limited to implementation on such computing devices, but may be implemented on any a variety of different types of computing devices within the scope of embodiments thereof.

As discussed above, exemplary components may include the obtaining component 211, the receiving component 212, the predictive component 213, the axis-calculating component 214, and the rendering component 215. In operation, the obtaining component 211 is configured to perform a variety of different activities. One of the activities involves obtaining, or accessing, raw data from database(s) that store information related to the subject ICU 280. In another instance, the step of accessing may include extracting pre-calculated values of a mortality rate and a mean length of stay that pertain to performance of the subject ICU 280 from the database(s).

Upon accessing the raw data, the obtaining component 211 may obtain, or derive, a mortality rate of the subject ICU 280 over a predefined period of time and/or derive a mean length of stay of patients in the subject ICU 280 over the predefined period of time. In another embodiment, the obtaining component 211 is configured to derive a performance of the subject ICU 280 with respect to a specific metric, where the presentation of the graphical objects on the UI display 235 may be directly affected by the performance of the subject ICU measured 280 against the specific metric.

The receiving component 212 is generally configured to receive raw data from the data store 280 and other locations, such as directly from processing units hosted in the other ICUs 260. This raw data generally relates to the performance of one or more of the other ICUs 260. Or, the receiving component 212 may extract raw data and/or processed information from a storage location internal to the computing device 210. In another embodiment, the receiving component 212 is configured to receive raw data from other hospital ICUs, while the predictive component 213 is configured to calculate predictive values of mortality rate and length of stay from the raw data. Typically, the obtaining component 211 and/or the receiving component 212 acquires information to create the graphic in response to a trigger. In one instance, the trigger may be a user-initiated selection on the UI display 235 received from the user-input device 216. The user-initiated selection, in one example, may be a click-action directed at a drop-down menu item that results in revealing the performance of the subject ICU 280 against a particular metric. In other embodiments, the obtaining component 211 and/or receiving component 212 pulls data from any number of remote or local sources periodically or at predetermined times.

The information gathered by the obtaining component 211 and/or receiving component 212 is generally passed to the predictive component 213 for filtering and refinement, or directly to the rendering component 215 for incorporation into the graphic. Generally, the predictive component 213 is configured to perform various analytical processes that produce benchmark variables (e.g., predicted values) for assessing a quality of critical care offered by an ICU. In one instance, the predictive component 213 may be configured to perform a derivation process that calculates predicted values used for evaluating operation of the subject ICU. The derivation process may include one or more of the following steps, in no particular order: generating a predicted value of a mortality rate utilizing historical medical records collected from the plurality of remote hospitals 260; and generating a predicted value of a length of stay in the subject ICU 280 utilizing historical medical records collected from the plurality of remote hospitals 260.

As used herein, the "mortality-rate predicted value" encompasses any representation of a benchmark mortality rate that can be used to compare against an actual mortality rate observed in the subject ICU 280. Accordingly, the mortality-rate predicted value is typically not simply an average of the mortality rates recorded at a population of ICUs 260, but a statistical model generated threshold for ascertaining whether the actual mortality rate observed in the subject ICU 280 is acceptable.

As used herein, the "length-of-stay predicted value" encompasses any representation of a benchmark duration of time that an average patient stays in the subject ICU 280 before being discharged. Generally, the duration of time is calculated in the units of actual days stayed by a average patient, as opposed to applying any weighting scheme to the days within a duration of an ICU stay. An instance of a weighting scheme applied to the days stayed in an ICU is found in a Rapoport-Teres chart. A general discussion of the Rapoport-Teres chart is presented in an article written by J. Rapoport, D. Teres, S. Lemeshow, and S. Gehlbach entitled "A Method for Assessing the Clinical Performance and Cost-effectiveness of Intensive Care Units: A Multicenter Inception Cohort Study" published in the Journal of Critical Care Medicine, 1994, 22(9):1385-1391. Specifically, the Rapoport-Teres chart depicts the length of stay in weighted hospital days, which can be misleading and difficult to interpret. Further, actual days are more accurate than weighted hospital days as weighted hospital days include meaningless days a patient may stay in the hospital after discharge from the ICU, which artificially inflates the length of stay. in particular, weighted hospital days include those days that a patient is officially discharged from the ICU yet remains under hospital care (e.g., stays in step-down unit of the hospital) without getting treatment until a bed is open in an outside facility (e.g., nursing home or other external post-acute-care setting). In an exemplary embodiment, the length-of-stay predicted value is typically not simply a number of days an average patient stays in an ICU, as recorded from a population of ICUs 260, but a statistical model generated threshold for ascertaining whether the actual length of stay observed in the subject ICU 280 is acceptable.

Although two different configurations of predicted values that are generated by the predictive component 212 have been described, it should be understood and appreciated by those of ordinary skill in the art that other benchmark variables may be derived utilizing historical medical records of the ICUs 280 and 260, and that embodiments of the present invention are not limited to those predicted values described herein. For instance, the computing device 212 may be configured to generate median values of ICU measured performance (e.g., reference numeral 340 of FIG. 3) and/or a 95% confidence interval (e.g., reference numeral 325 of FIG. 3) that indicates whether a difference between the measured performance and the predicted values of the subject ICU 280 is statistically significant.

The rendering component 215 is generally configured to generate graphical objects based on the information passed from the obtaining component 211, the receiving component 212, and the benchmark variables derived by the predictive component 213. In one embodiment of generating graphical objects, the rendering component 215 is configured to present a 2-dimensional graph (e.g., reference numeral 320 of FIG. 3) that includes an X-axis and a Y-axis. Typically, the X-axis represents a first metric for evaluating operation of an ICU and the Y-axis represents a second metric for evaluating operation of an ICU. As used herein, the term "metric" generally refers to one of a system of related measures that facilitates the quantification of some particular characteristic of ICU operation.

Figure 3:
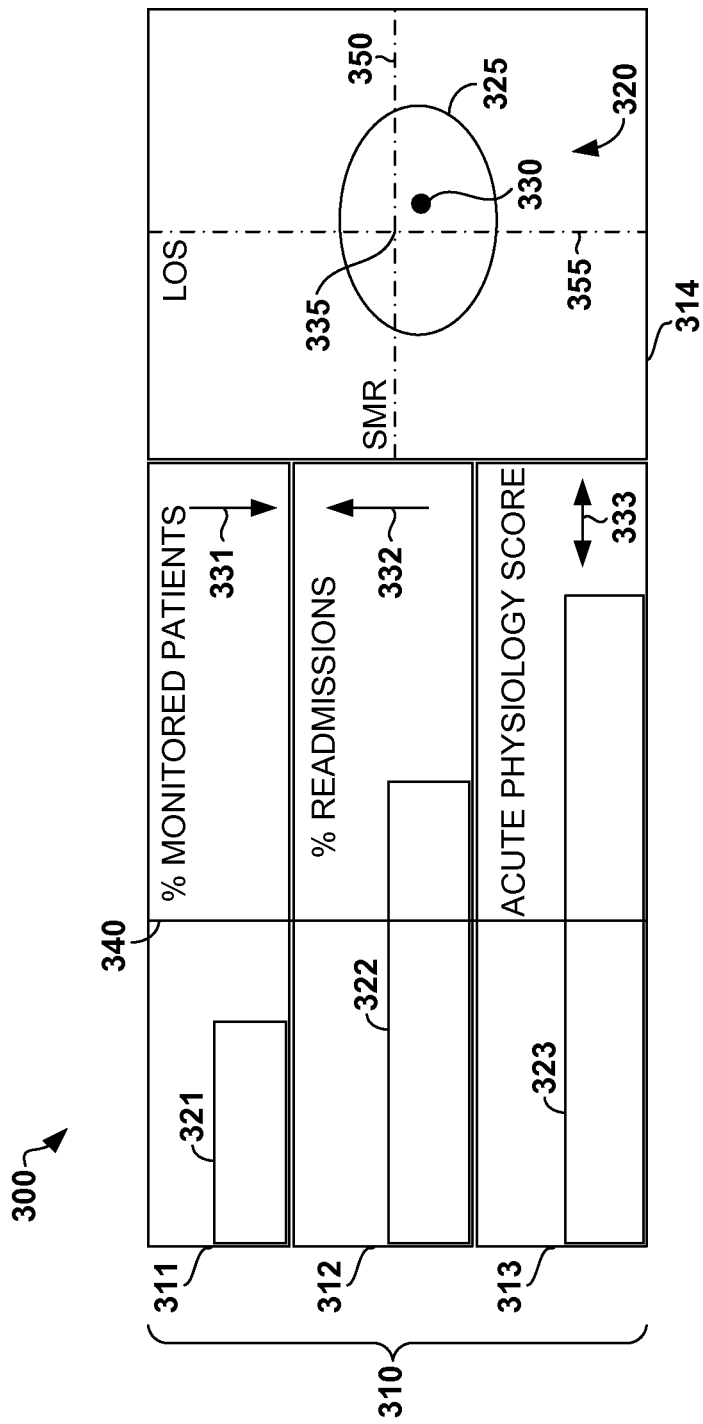
FIGS. 3-7 are illustrative screen displays showing exemplary user interfaces, in accordance with embodiments of the present invention.

In an exemplary embodiment, as shown in FIG. 3, the first metric relates to hospital mortality rate and the second metric relates to ICU length of stay. Specifically, the X-axis represents predicted mortality rate value over the measured mortality rate value. This ratio may be calculated by the axis-calculating component 214 of FIG. 2. The Y-axis represents a difference between the predicted mean length of stay value and the measured mean length of stay value. This difference may also be calculated by the axis-calculating component 214. Specifically, the ratio and difference, as well as other metrics that may be represented by the X-axis and the Y-axis, may be calculated by an axis-graphic subcomponent 281 of the axis-calculating component 214. Accordingly, increments on the X-axis may signify a ratio of the predicted hospital/ICU mortality rate for the subject ICU 280 over the observed hospital/ICU mortality rate, while increments on the Y-axis may signify a difference between the average length of stay predicted at the subject ICU 280 and the observed length of stay value. As such, the origin 335 of the 2-dimensional graph 320 may have the coordinates (1,0).

A plotting subcomponent 282 of the axis-calculating component 214 may be responsible for plotting a data point (e.g., reference numeral 330 on FIG. 3) on the 2-dimensional graph at a certain location. Generally, the location of the data point visually indicates a performance, measured over a predefined period of time, of the subject ICU 280 with respect to the first metric and the second metric. In other words, the plotted location of the data point on the 2-dimensional graph depicts two performance assessments of the subject ICU 280 during the predefined period of time.

As illustrated in FIG. 3, the X-axis 350 and the Y-axis 355 divide the 2-dimensional graph 320 into four quadrants. The location of the data point 330 shows how the subject ICU 280 is performing, as measured against the first metric (mortality rate) and the second metric (length of stay), in comparison to the predicted values of mortality rate and length of stay. If the observed performance of the subject ICU 280 is better than the mortality-rate predicted value (i.e., the mortality rate for a patient in the subject ICU is lower than the established benchmark mortality rate), then the location of the data point 330 will reside in one of the upper two quadrants. If the observed performance of the subject ICU 280 is better than the length-of-stay predicted value (i.e., the mortality rate associated with the subject ICU is lower than the established benchmark mortality rate), then the location of the data point 330 will reside in one of the right two quadrants. As shown, the data point 330 visually indicates that the subject ICU's observed length of stay is slightly longer than predicted (poor), while the subject ICU's observed mortality rate for is slightly lower than predicted (good).

In embodiments, with continued reference to FIG. 3, the axis-calculating component 214 is further configured to construct a representation of a 95% confidence interval 325 about an intersection 335 of the X-axis 350 and the Y-axis 355 on the 2-dimensional graph 320. As illustrated, the representation of the 95% confidence interval is displayed as an ellipse. However, the representation of the 95% confidence interval may take any number of forms, such as another geometric shape or a shaded area. In operation, the 95% confidence interval, (i.e. bivariate 95% confidence region), describes a level of confidence in a determination of whether the subject ICU 280 is performing significantly better or worse than predicted. In other words, the 95% confidence interval tells a user whether the location of the data point 330 on the 2-dimensional graph 320 is statistically significant.

When reading the representation of the 95% confidence interval 325 on FIG. 3, the position of the data point 330 with respect to the ellipse indicates whether the performance of the subject ICU 280 is statistically significant in comparison to the origin 335 of the 2-dimensional graph 320. If the data point 330 is inside or on the ellipse, the plotted ICU performance is not statistically significant with respect to the origin 335 (i.e., the subject ICU performance reflects what was expected in the context of information gathered from other ICUs over time). This is the case illustrated in FIG. 3. If the data point 330 is outside the ellipse, the plotted ICU performance is statistically significant with respect to the origin 335 (i.e., the subject ICU performance differs from was expected in the context of information gathered from other ICUs over time for one or both metrics).

In addition to the 2-dimensional graph 320 of FIG. 3, the rendering component 213 of FIG. 2 may be configured to render one or more data strips (e.g., reference numerals 321, 322, and 323 of FIG. 3). The information within the data strip(s) may be obtained by the obtaining component 211 (e.g., raw performance data or processed performance data from the subject ICU 280) and may be received by the receiving component 212 (e.g., median values of performance of a group of the other ICUs 260 with respect to one or more metrics). In an exemplary embodiment, the data strip(s) are located adjacent to or adjoin the 2-dimensional graph 320. As illustrated in FIG. 3, the data strips 321, 322, and 323 may be presented in a stack 310 and may be layered side-by-side and orientated in a horizontal fashion. Although described and illustrated as being horizontally orientated in parallel-spaced relation, the data strips 321, 322, and 323 may be positioned and orientated in any fashion. Further, although three data strips 321, 322, and 323 are described and illustrated, it should be appreciated and understood that any number of data strips may be included in the graphic 300 generated by the rendering component 213. Further, the data strips 321, 322, and 323 may be rendered in varying colors, a consistent color, or without color, based on user preference.

As illustrated in the graphic 300 of FIG. 3, the lengths of each of the data strips 321, 322, and 323 visually indicate a performance of the subject ICU 280 with respect to a specific metric and provide the ICU manager or administrator with an intuitive graphical object for evaluating the operation of the subject ICU 280. In operation, the lengths of each of the data strips 321, 322, and 323 move similar to a thermometer. That is, as illustrated in FIG. 3, the farther to the right a given data strip extends, the higher the value of the ICU performance measured against a particular metric.

By way of example, the length of the first data strip 321 visually indicates a performance, measured over a predefined period of time, of the subject ICU 280 with respect to a third metric, where the first metric (mortality rate) is depicted by the X-axis 350 and the second metric (length of stay) is depicted by the Y-axis 355. As shown, the third metric by default pertains to a percentage of patients that did not receive active treatment within the first day after being admitted to the subject ICU 280 and a display area 311 that includes the first data strip 321 is labeled "% MONITORED PATIENTS." The length of the second data strip 322 visually indicates a performance, measured over the predefined period of time, of the subject ICU 280 with respect to a fourth metric. As shown, the fourth metric by default pertains to a rate at which patients released from the subject ICU 280 are readmitted to an ICU during the patients' stay at a hospital and a display area 312 that includes the second data strip 322 is labeled "% READMISSIONS." The length of the third data strip 323 visually indicates a performance, measured over the predefined period of time, of the subject ICU 280 with respect to a fifth metric. As shown, the fifth metric by default pertains to a median of the day 1 acute physiological score (APS) calculated from each of the patients admitted to the subject ICU 280 during a predefined period of time and a display area 313 that includes the third data strip 323 is labeled "ACUTE PHYSIOLOGY SCORE."

The APS for a patient admitted to subject ICU 280 may be calculated in a variety of ways. In an exemplary embodiment, a value of an APS for a particular patient may be calculated by first determining the worst value for each physiologic parameter measured, assigning appropriate weights depending on the severity of each worse value, then summing the weights over all physiologic measures. In operation, the APS provides an indication of an overall illness severity of the patient. The details of an exemplary methodology for generating the APS are set forth in pages 18-25, paragraphs [0049]-[0059], of U.S. patent application Ser. No. 12/569,575, filed Sep. 29, 2009, entitled "GRAPHICALLY REPRESENTING PHYSIOLOGY COMPONENTS OF AN ACUTE PHYSIOLOGICAL SCORE (APS)," the cited disclosure of which is herein incorporated by reference.

Generally, the metrics shown in the graphic 300 of FIG. 3 are either directly or indirectly related to one another. As illustrated, the third, fourth, and fifth metrics of the data strips 321, 322, and 323 are related in some fashion to the first and second metrics of the 2-dimensional graph 320, which is rendered in display area 314. In this way, the data strips 321, 322, and 323 provide a context for, or help explain, the location of the data point 330 on the 2-dimensional plot 320. As such, fluctuations in ICU performance measured against the third, fourth, and fifth metrics directly affects the location of the data point 330.

With continued reference to FIG. 3, reference numeral 340 depicts a set of bars that represent median values. The median values are illustrated as orientated vertically and aligned with each other; however, the median values may be depicted as non-aligned bars or indicators that vary in position between the display areas 311, 312, and 313. As used herein, the phrase "median value" is not meant to be limiting, but generally refers to a variable that is calculated based on the performance of a group of hospitals with data acquisition capability (e.g., the plurality ICUs 260 of FIG. 2) recorded over a predefined duration of time. In one instance, the predefined duration of time is a 3-month timeframe. Use of a median value is typically more accurate than calculating an average value of ICU performance (i.e., provides a truer midpoint of a population) because the median value reduces the influence of a skewed measurements recorded at hospitals or ICUs that are dealing with abnormal situations (e.g., natural disaster or inner-city location).

A so-called "bullet graph" compares current performance of the subject ICU against some previously measured performance of the same ICU. In contrast, the lengths of the data strips 321, 322, and 323 provide a comparison of the subject ICU's current performance, with respect to the third, fourth, and fifth metrics, against a median value of performance achieved by a population of other ICUs. As shown by the length of the first data strip 321 in FIG. 3, the percentage of patients that are being monitored, as opposed to those receiving active treatment, is significantly less than the median value of other ICUs. This indicates that the subject ICU is efficiently using its resources—properly admitting those patients needing life-sustaining therapy, while moving patients that require only intensive monitoring to a step-down unit or intermediate care unit.

The length of the second data strip 322 indicates that a readmission rate of the subject ICU (i.e., percentage of the patients that were seen in the subject ICU, then discharged, and then readmitted to the subject ICU or another ICU during a hospital stay) is slightly greater than the median value of other ICUs. Accordingly, the second data strip 322 clearly presents the comparative performance of the subject ICU with respect to the fourth metric, and alerts an ICU manager or administrator to focus on improving activities carried out in the subject ICU that can cause a patient to be prematurely discharged. Further, because the readmission rate and the length of stay are inversely proportional, the high readmission rate indicates that the performance of the subject ICU with respect to the second metric (length of stay) is artificially low. Accordingly, the data strips provide some insight into why the data point 330 is plotted at its present location.

The length of the third data strip 323 indicates that the average APS of a patient admitted to the subject ICU during the predefined period of time is vastly greater than the median value of other ICUs. Accordingly, the third data strip 323 clearly shows the comparative performance of the subject ICU with respect to the fifth metric and explains why the mortality rate of the subject ICU may be temporarily inflated, as the mortality rate and the APS generally move together.

Beyond the data strips 321, 322, and 323, the rendering component 213 of FIG. 2 may create other graphical objects that depict a trend in the measured performance of the subject ICU 280 between a previous timeframe and the current predefined period of time. As illustrated in FIG. 3, these graphical objects are represented as arrows 331, 332, and 333, where an orientation of the arrows 331, 323, and 333 indicates an amount of change in the measured performance of the subject ICU 280 with respect to the third metric, the fourth metric, and the fifth metric, respectively. By way of example, the arrow 331 indicates that the percent of monitored patients admitted into the subject ICU 280 during the latest quarter-year period, compared against a precedent quarter-year period, is trending downwards. The arrow 332 indicates that the percentage of readmissions resulting from patients prematurely released from the subject ICU 280 in the latest quarter-year period is trending upwards from a precedent quarter-year period. And, the arrow 333 indicates that an APS of the average patient admitted to the subject ICU 280 during the latest quart-year period has not changed from the previous quarter-year period.

Although the predefined period of time is frequently referred to as a quarter-year period, embodiments of the present invention contemplate using any static period of time (e.g., minutes, hours, days, weeks, or years) or dynamically shifting window of time (e.g., rolling three-month window). Further, although depicted as colorless, the arrows 331, 332, and 333 may be color-coded to indicate whether the present trend is good (e.g., green arrow), bad (e.g., red arrow), or neutral (e.g., yellow arrow). Even further, although arrows of varied orientation are illustrated as the graphical objects employed to depict a trend, any symbols, text, or other indicators may be used.

Figure 4:
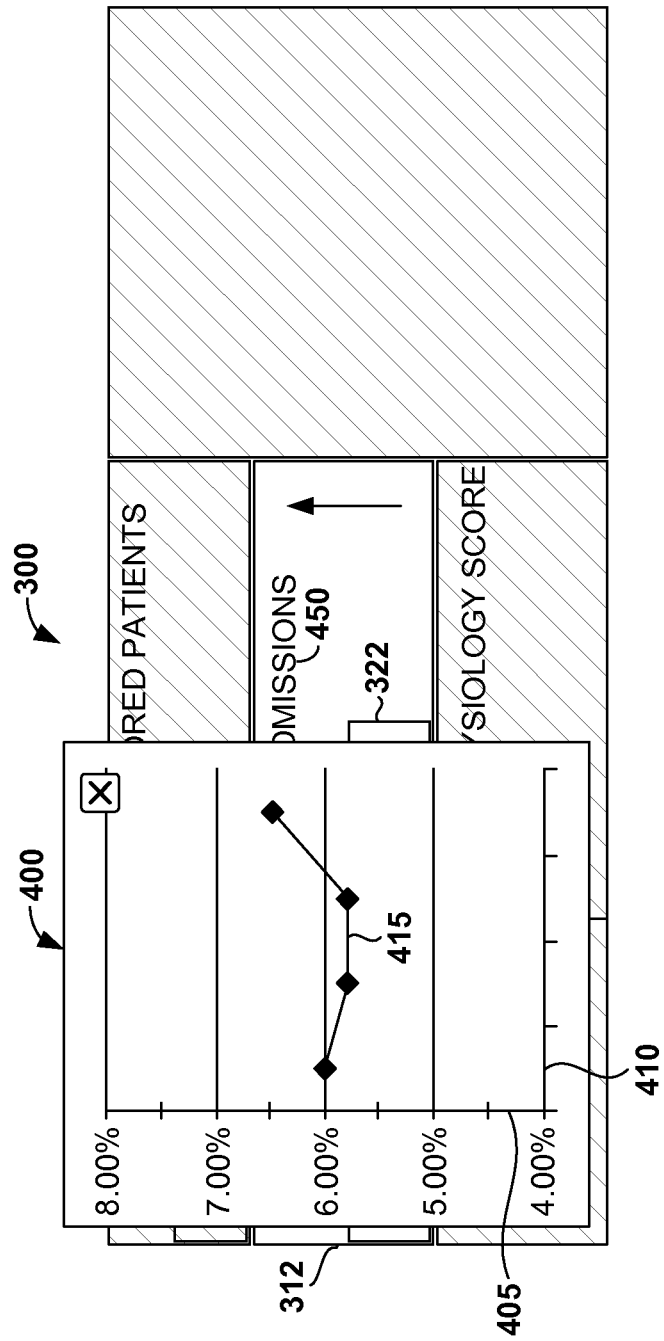

Turning to FIG. 4, the graphic 300 is shown with a display area 400 overlaying a portion thereof, where the display area 400 includes an exemplary line graph 415. The display area 400 may be configured as a pop-up graph that is invoked upon detecting that a user-initiated selection has occurred within a display area on the data strip. By way of example, the display area 400 may be presented upon detecting a click-action directed toward the second data strip 322 or within the boundary of the display area 312.

The line graph 415 serves to provide a visual representation of a historical trend of one aspect of ICU performance. As illustrated, the line graph 415 includes a plurality of data points that typically correspond to performance measured during a particular period of time. For instance, the data point furthest to the right visually indicates the performance of the subject ICU with respect to the fourth metric during a most-recent period of time. The locations of the second, third, and fourth data points (moving from right to left) represent the performance of the subject ICU with respect to the fourth metric during three predefined timeframes that occurred sequentially prior to the most-recent period of time. The X-axis 410 of the pop-up graph indicates the time period that corresponds to each of the four data points. The Y-axis 405 represents values of the fourth metric, which the performance of subject ICU is being measured against. In an exemplary embodiment, the scaling and the increments of the Y-axis 405 are automatically self-adjusted to substantially center the line graph 415 on the pop-up graph.

As depicted in FIG. 4, the display area 312, which is associated with the line graph 415, remains active, while the other display areas of the graph 300 are grayed-out to show that they are inactive. Further, the configuration of the line graph 415 (having a line that connects the data points) is only one of the various completed embodiments. Any suitable mechanism for analyzing a trend may be rendered in the display area 400. For instance, a scatter plot with fifty-two data points that shows yearly performance segmented by week-long blocks may be employed in place of the line graph 415. In another instance, the data points may vary in color or shape to clearly delineate the measured performance over time.

Figure 5:
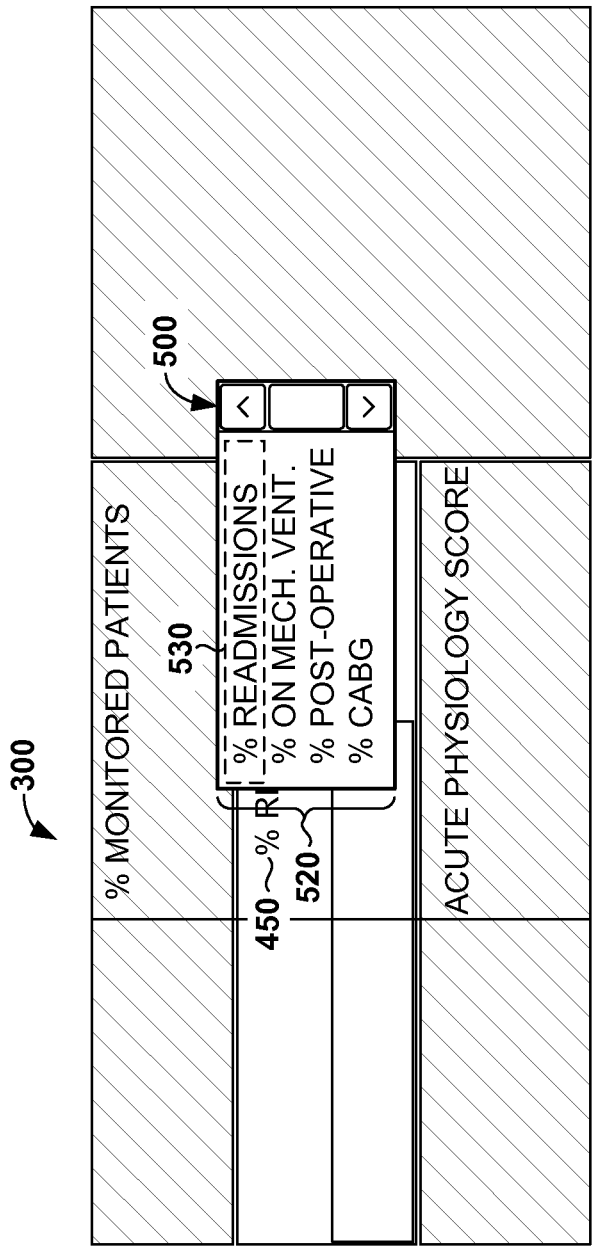

With reference to FIG. 5, the graphic 300 is shown with a display area 500 overlaying a portion thereof, where the display area 500 includes an exemplary menu of metrics 520. The menu may be configured to present a list of selectable metrics 520 in any suitable form. For instance, the menu may be configured as a drop-down menu that is invoked upon receiving a user-initiated selection. In an exemplary embodiment, a user-initiated selection directed at one of the labels invokes the display area 500 to appear and to publish the menu to the user. Although one type of trigger-event is described for invoking the menu, it should be understood and appreciated that the menu may be invoked by any operation provided by the user via a user interface input, such as a touch-type user action within a target zone on a touchscreen, or a hover action of a mouse cursor over a label 450.

As illustrated, the menu enumerates a set of metrics 520 that can be selected for view. In embodiments, the set of metrics may include one or more of the metrics discussed above, and/or one or more of the following metrics: a percentage of patients that are readmitted to an ICU; a percentage of patients that are on mechanical ventilation; a percentage of patients that are being treated for post-operative ailments; and a percentage of patients that received coronary artery bypass surgery. It should be appreciated and understood that the metrics described herein do not compose an exhaustive list of metrics that may be used to populate the menu of the display area 500. Accordingly, any other metrics used for evaluating operation of an ICU or that an ICU manager or administrator would deem helpful to analyze an ICU's performance may be included in the menu.

In operation, upon receiving a user-initiated selection on a metric within the set of metrics 520, a fourth data strip that represents the selected metric may be generated, where the length of the fourth data strip visually indicates a performance, measured over the predefined period of time, of the subject ICU with respect to the selected metric. This new fourth data strip replaces the previous first data strip, the second data strip, or the third data strip within the graphic 300. Accordingly, the information presented within the graphic may be dynamically manipulated on-the-fly and customized to present those performance metrics that are interesting to a user at a particular point in time. For instance, the interesting performance metrics may be related to the focus of the subject ICU (e.g., medical, trauma, surgical, coronary, and the like).

Figure 6:
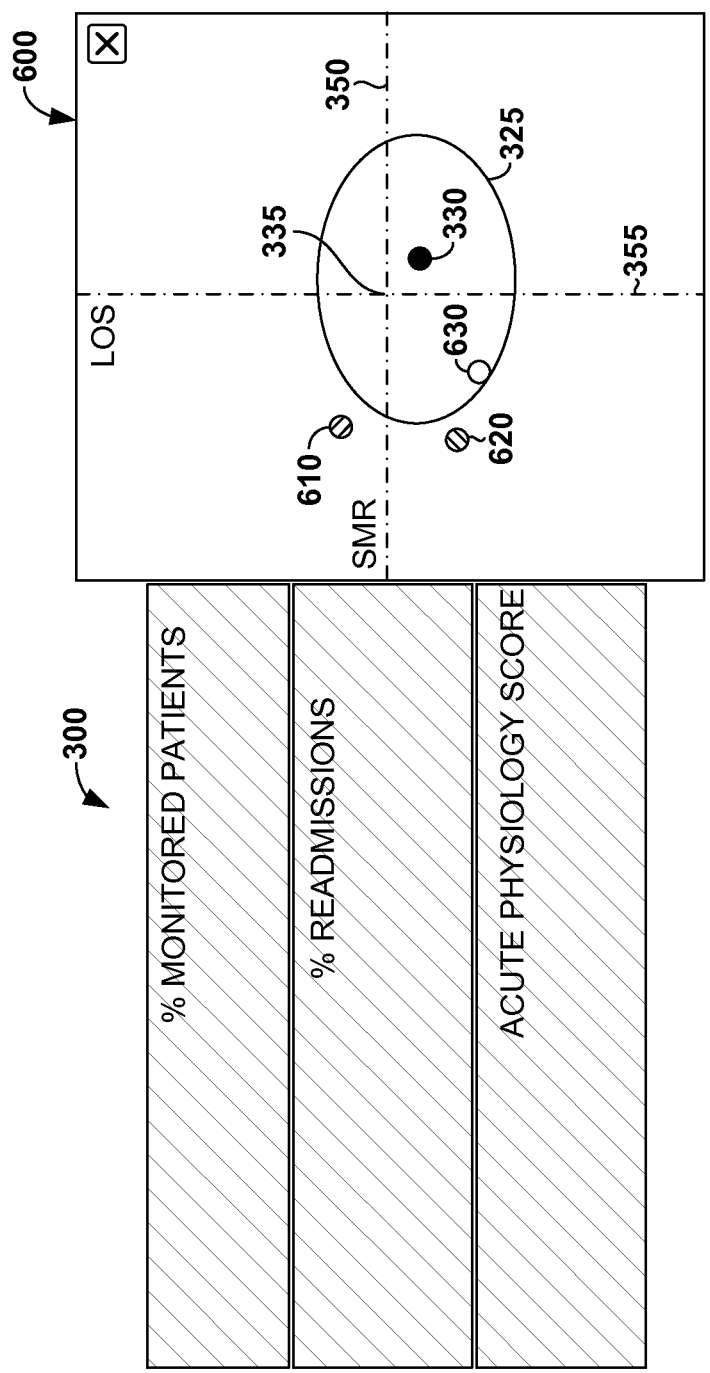

With reference to FIG. 6, the graphic 300 is shown with a display area 600 overlaying a portion thereof, where the display area 600 includes an exemplary scatter plot of data points 330, 610, 620, and 630. The display area 600 may be configured as a pop-up graph (e.g., an enlarged depiction of the 2-dimensional graph 320 of FIG. 3) that is invoked upon detecting that a user-initiated selection has occurred within a display area that includes the 2-dimensional graph. By way of example, the display area 600 may be presented upon detecting a click-action directed to one of the four quadrants of the 2-dimensional graph.

The scatter plot of the data points 330, 610, 620, and 630 serves to provide a visual representation of a historical trend of ICU performance. As illustrated, the data points 330, 610, 620, and 630 typically correspond to performance measured during sequential periods of time. For instance, the data point 330 visually indicates the performance of the subject ICU with respect to the first and second metrics during a most-recent period of time. The locations of the other data points 610, 620, and 630 represent the performance of the subject ICU with respect to the first and second metrics during three predefined timeframes that occurred prior to the most-recent period of time. In an exemplary embodiment, the color of the data points 330, 610, 620, and 630 indicates the time period that corresponds with each. In one instance, a key or legend is provided (not shown) that maps the color of each of the data points 330, 610, 620, and 630 to a period of time.

In another instance, hovering over one or more of the data points 330, 610, 620, and 630 produces a window with a range of dates associated with the selected data point(s). For example, suppose the data point 330 is based on a most-recent time period of 10/2009-12/2009 and is colored black, the data point 610 is based on the time period immediately preceding the data point 330 (7/2009-9/2009) and is colored blue, the data point 620 is based on the time period of 4/2009-6/2009 and is colored purple, and the data point 630 is based on the time period of 1/2009-3/2009 and is colored red. In this example, the time period corresponding to each of the data points 330, 610, 620, and 630 may be identified by either referencing a legend or hovering over a particular data point, which will show the month range in the year 2009. Accordingly, the intuitive association between the data points 330, 610, 620, and 630 and their respective time periods allows an ICU manager or administrator to quickly understand a trend in the performance of the subject ICU as measured against the first and second metrics. As shown in FIG. 6, the performance of the subject ICU has declined in length of stay but has improved in hospital mortality rate.

Similar to the display area 400 of FIG. 4, the display area 600 of FIG. 6 may be emphasized with respect to the other display areas of the graphic 300. In one instance, a background of the display area may be highlighted in a brilliant color (e.g., yellow) to indicate it is active. In another instance, the other display areas may be deemphasized, or grayed-out, to indicate they are inactive. Although two different features for drawing a user's attention to the display area 600 have been described, it should be understood and appreciated that other types of suitable methods for highlighting/emphasizing may be used, and that embodiments of the present invention are not limited to those methods described herein.

Figure 7:
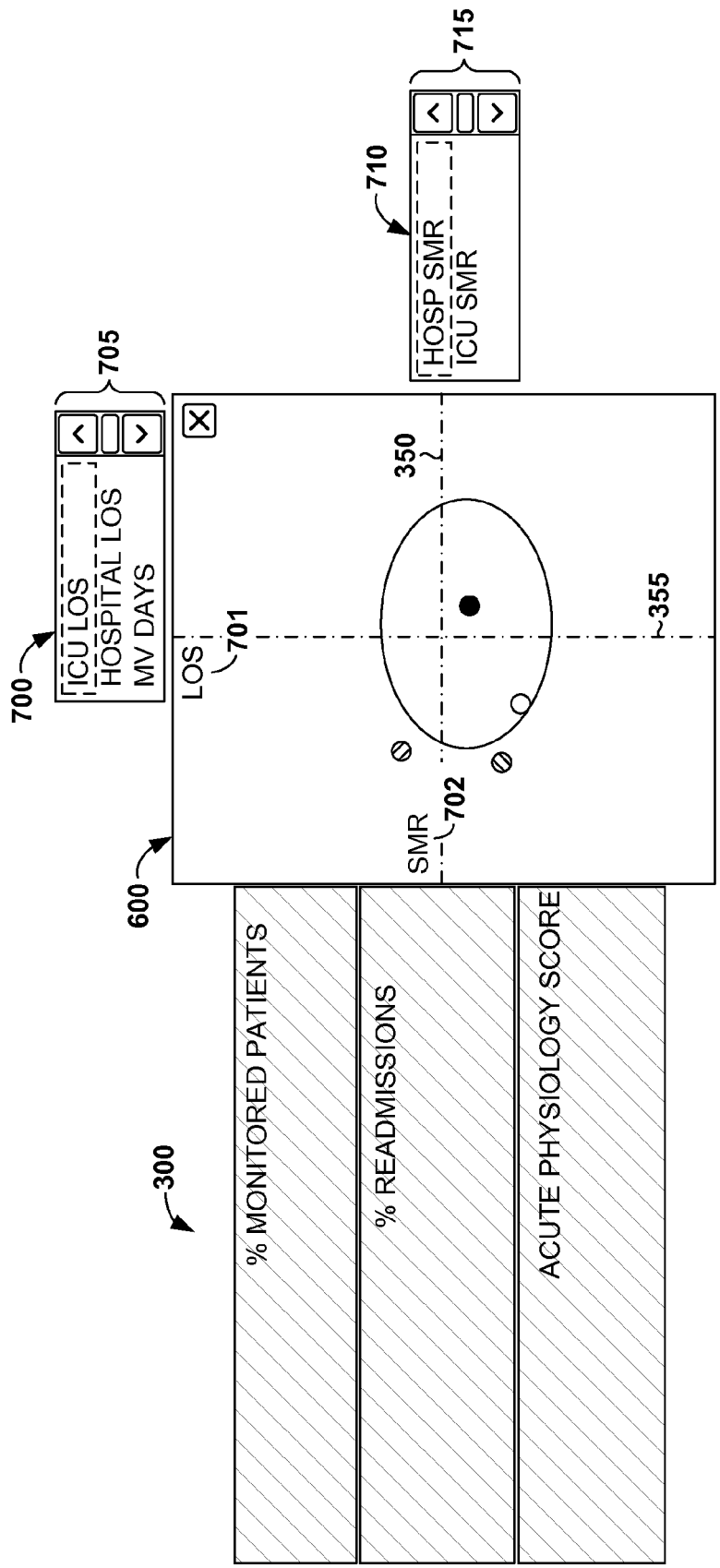

With reference to FIG. 7, the graphic 300 is shown with a display areas 700 and 710 positioned proximately thereto, where the display areas 700 and 710 include exemplary menus of metrics 705 and 715, respectively. The menus may be configured to present a list of selectable metrics 705 and 715 in any suitable form. For instance, the menus may be configured as drop-down menus that are invoked upon receiving a user-initiated selection. In an exemplary embodiment, a user-initiated selection directed at one of the labels 701 or 702 of the axes 350 or 355, respectively, invokes one of the display areas 700 or 710 to appear and to publish the menu to the user.

As illustrated, each menu enumerates a set of metrics 705 or 715 that can be selected for view. In embodiments, the set of metrics 705 related to the Y-axis 355 may include one or more of the metrics discussed above, and/or one or more of the following metrics: ICU LOS (length of stay); hospital LOS; and MV (duration of mechanical ventilation) days. In embodiments, the set of metrics 715 related to the X-axis 350 may include one or more of the metrics discussed above, and/or one or more of the following metrics: Standardized Mortality Ratio (SMR) for the ICU mortality rate; and SMR for the hospital mortality rate. It should be appreciated and understood that the metrics described herein do not compose an exhaustive list of metrics that may be used to populate the menus of the display areas 700 and 710. Accordingly, any other metrics used for evaluating operation of an ICU or that an ICU manager or administrator would deem helpful to analyze an ICU's performance may be included in either or both of the menus 700 and 710.

Figure 8:
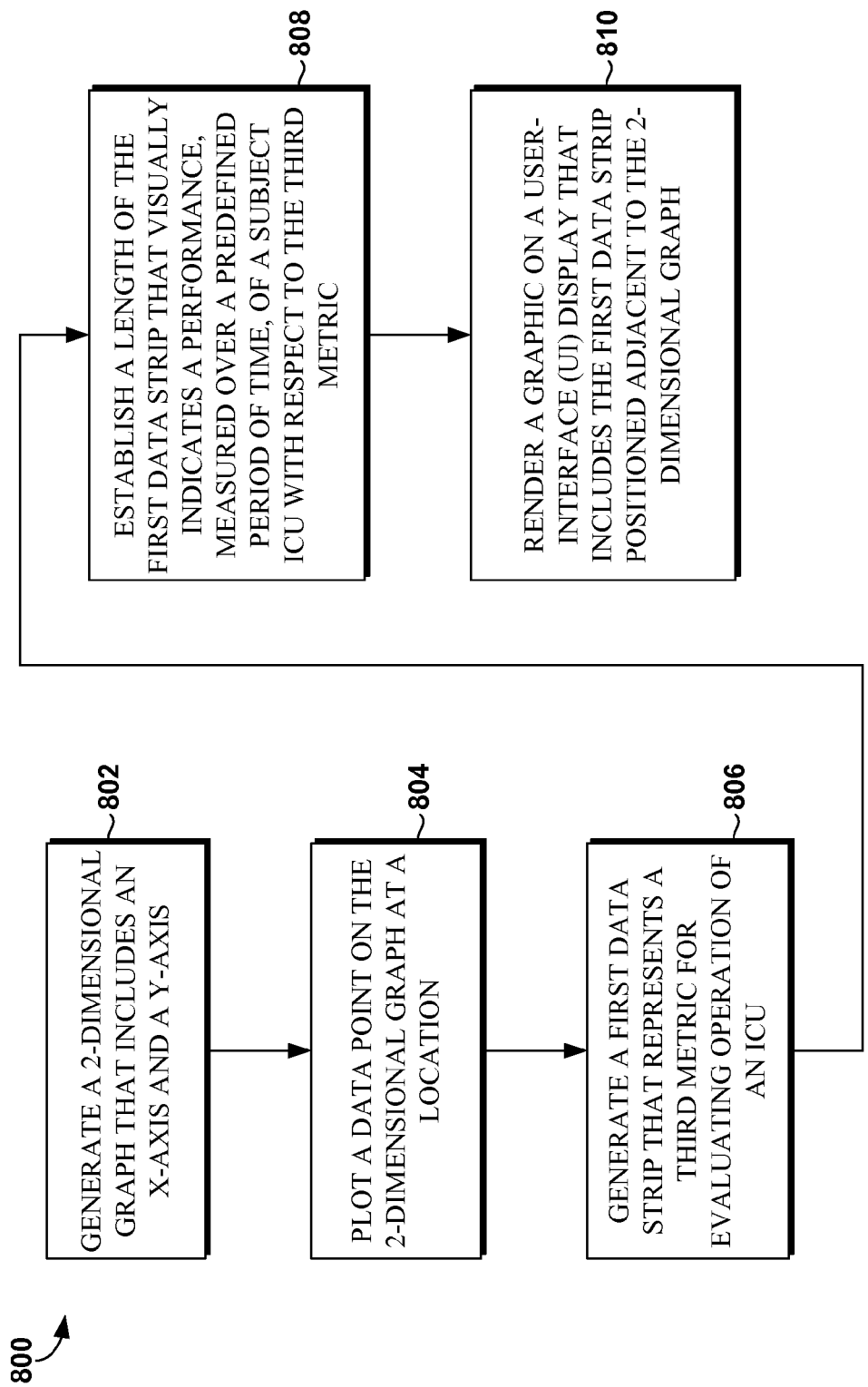
FIG. 8 is an illustrative flow diagram of a method for producing a graphic that exposes a measured performance of a subject intensive care unit (ICU), in accordance with an embodiment of the present invention.

Turning to FIG. 8, an illustrative flow diagram of a method 800 for producing a graphic that exposes a measured performance of a subject ICU, is shown, in accordance with an embodiment of the present invention. Further, when describing the flow diagram FIG. 8, although the terms "step," "block," and "process" are used hereinbelow to connote different elements of methods employed, the terms should not be interpreted as implying any particular order among or between various steps herein disclosed unless and except when the order of individual steps is explicitly described.

Initially, the method 800 includes the step of generating a 2-dimensional graph that includes an X-axis and a Y-axis, as indicated at block 802. In one instance, the X-axis represents a first metric for evaluating operation of an ICU and the Y-axis represents a second metric for evaluating operation of an ICU. The method 800 may further involve plotting a data point on the 2-dimensional graph at a location, as indicated at block 804, as well as that point's 95% confidence interval. This location visually indicates a performance, measured over a predefined period of time, of the subject ICU with respect to the first metric and the second metric. As indicated at block 806, a first data strip that represents a third metric for evaluating operation of an ICU may be generated. In an exemplary embodiment, the length of the first data strip visually indicates a performance, measured over the predefined period of time, of the subject ICU with respect to the third metric. This is indicated at block 808.

In an exemplary embodiment, the first data strip and the 2-dimensional graph are interrelated. For instance, the location of the data point on the 2-dimensional plot may be directly affected by performance of the subject ICU measured against the third metric. The first data strip may be positioned adjacent to the 2-dimensional graph when rendered within the graphic on a UI display, as indicated at block 810. This allows an ICU manager or administrator to simultaneously view performance measures that largely influence the overall operation of the subject ICU. Other data strips may be positioned adjacent to the first data strip based on the configuration of the overall graphic, which may be governed by a default setting or instructions from an administrator that is using the graphic.

Figure 9:
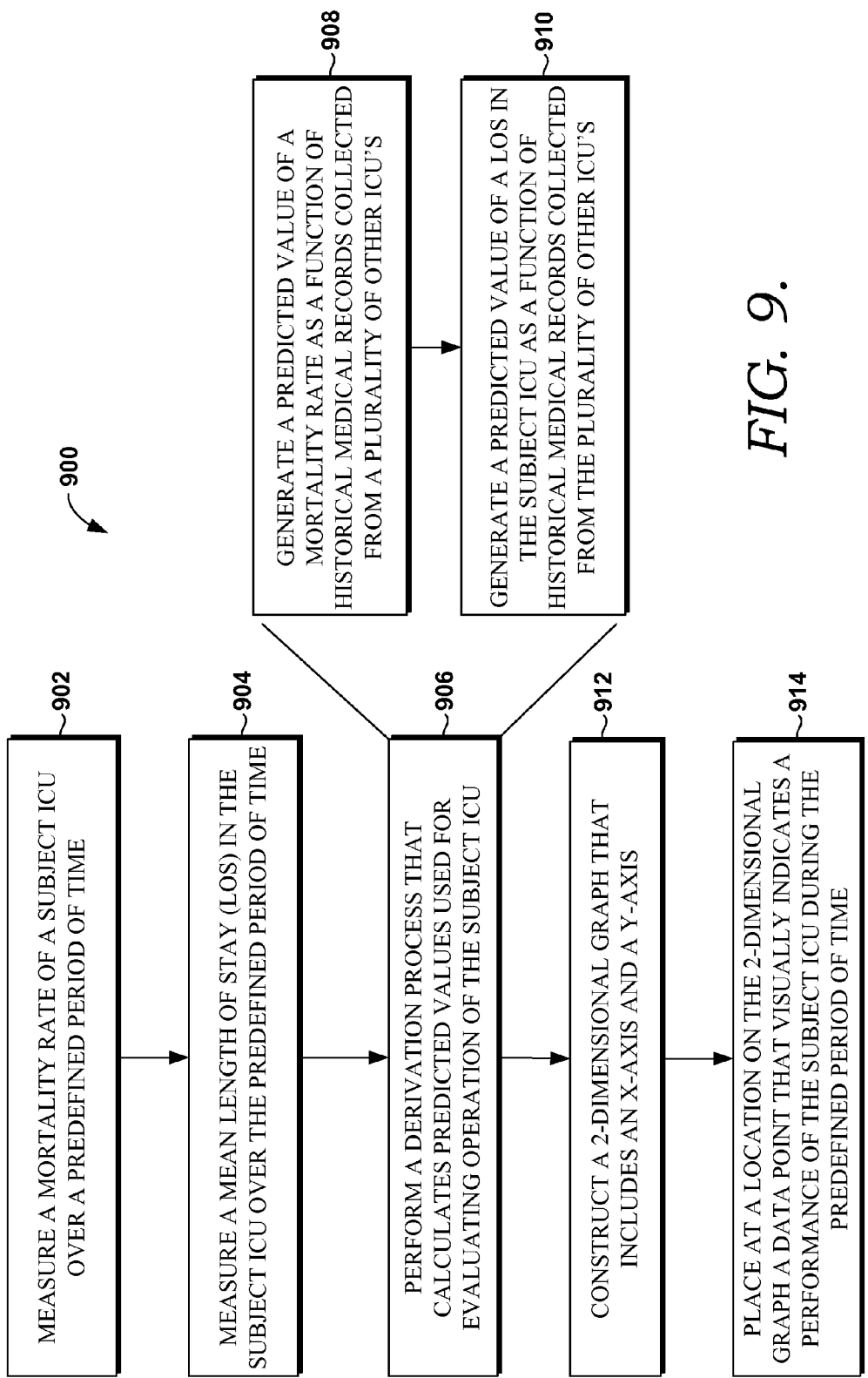
FIG. 9 is an illustrative flow diagram of a method for presenting a graphic that provides an aggregate view of performance measurements for a subject ICU, in accordance with an embodiment of the present invention.

With reference to FIG. 9, an illustrative flow diagram of a method 900 for presenting a graphic that provides an aggregate view of performance measurements for a subject ICU, is shown, in accordance with an embodiment of the present invention. The method 900 may involve obtaining (retrieving and/or deriving) a mortality rate of the subject ICU over a predefined period of time (see block 902) and obtaining (retrieving and/or deriving) a mean length of stay in the subject ICU over the predefined period of time (see block 940). As indicated a block 906, a derivation process may be performed that calculates predicted values used for evaluating operation of the subject ICU. In one instance, the derivation process includes the following steps: generating a predicted value of a mortality rate utilizing historical medical records collected from a plurality of remote hospitals (see block 908); and generating a predicted value of a length of stay in the subject ICU utilizing historical medical records collected from the plurality of remote hospitals (see block 910). Typically, the mortality-rate predicted value represents a benchmark mortality rate, while the length-of-stay predicted value represents a benchmark duration of time an average patient stays in the subject ICU before being discharged.

As indicated at block 912, a 2-dimensional graph that includes an X-axis and a Y-axis is constructed. In an exemplary embodiment, the X-axis represents a ratio of the predicted mortality rate value over the measured mortality rate value and the Y-axis represents a difference between the predicted mean length of stay value and the measured mean length of stay value. As indicated at block 914, a data point is placed at a location on the 2-dimensional graph that visually indicates a performance of the subject ICU during the predefined period of time. Accordingly, the graphic provides value to hospital staff by providing various concurrent and trended assessments of the ICU performance and by facilitating objective evaluation of the impact of particular metrics on the quality of critical care offered by the ICU.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable memory accommodated by a computing device having computer-useable instructions embodied thereon that, when executed, perform a method for producing a graphic that exposes a measured performance of a subject intensive care unit (ICU), wherein the method comprises:

generating a two-dimensional graph that includes an X-axis and a Y-axis, wherein the X-axis represents a first metric for evaluating operation of an ICU and the Y-axis represents a second metric for evaluating operation of an ICU, wherein the first and second metrics represent respective quantifications of characteristics measured from ICU operation;

plotting a data point on the two-dimensional graph at a location in relation to predicted values of performance for a population of ICUs, wherein the location visually indicates a performance, measured over a predefined period of time, of the subject ICU with respect to the first metric and the second metric;

plotting a ninety-five percent confidence interval about an intersection of the X-axis and the Y-axis on the two-dimensional graph, the confidence interval indicates whether a difference between a measured performance and the predicted values of the subject ICU is statistically significant, and wherein the confidence interval is displayed as an ellipse;
generating a first data strip that represents a third metric for evaluating operation of an ICU;
establishing a length of the first data strip that visually indicates a performance, measured over the predefined period of time, of the subject ICU with respect to the third metric, wherein the location of the data point on the two-dimensional plot is affected, in part, by performance of the subject ICU measured against the third metric;
rendering the graphic on a user-interface (UI) display, wherein the graphic includes the first data strip positioned adjacently to the two-dimensional graph.

2. The non-transitory computer-readable media of claim 1, wherein the method further comprises:
generating a second data strip that represents a fourth metric for evaluating operation of an ICU;
establishing a length of the second data strip to visually indicate a performance, measured over the predefined period of time, of the subject ICU with respect to the fourth metric, wherein the location of the data point on the 2-dimensional plot is affected, in part, by performance of the subject ICU measured against the fourth metric; and
rendering the second data strip within the graphic in substantially parallel-spaced relation to the first data strip.

3. The non-transitory computer-readable memory of claim 2, wherein the method further comprises:
generating a third data strip that represents a fifth metric for evaluating operation of an ICU;
establishing a length of the third data strip to visually indicate a performance, measured over the predefined period of time, of the subject ICU with respect to the fifth metric, wherein the location of the data point on the 2-dimensional plot is affected, in part, by performance of the subject ICU measured against the fifth metric; and
rendering the third data strip within the graphic in substantially parallel-spaced relation to the second data strip and the first data strip.

4. The non-transitory computer-readable media of claim 3, wherein the method further comprises displaying labels that describe which metric is represented by each of the first data strip, the second data strip, and the third data strip, respectively, wherein a user-initiated selection at one of the labels invokes a drop-down menu to appear.

5. The non-transitory computer-readable memory of claim 4, wherein the drop-down menu enumerates a set of metrics, and wherein the method further comprises:
receiving a user-initiated selection on a metric of the set of metrics;
generating a fourth data strip that represents the selected metric for evaluating operation of an ICU;
establishing a length of the fourth data strip to visually indicate a performance, measured over the predefined period of time, of the subject ICU with respect to the selected metric, wherein the location of the data point on the 2-dimensional plot is affected, in part, by performance of the subject ICU measured against the selected metric; and
within the graphic, replacing one of the first data strip, the second data strip, or the third data strip with the fourth data strip.

6. The non-transitory computer-readable media of claim 5, wherein the method further comprises:
determining median values for the first metric, the second metric, and the third metric, respectively, wherein the median values are derived from historical medical records collected from a plurality of remote hospitals;
representing the median values as a vertical line that overlays the first data strip, the second data strip, and the third data strip, respectively.

7. The non-transitory computer-readable memory of claim 6, wherein the first data strip, the second data strip, and the third data strip are stacked side-by-side and orientated horizontally, and wherein the vertical lines that represent the median values are orientated vertically and aligned with each other.

8. The non-transitory computer-readable media of claim 3, wherein the method further comprises rendering graphical objects in proximity to each of the first data strip, the second data strip, and the third data strip, respectively, wherein each of the graphical objects depict a trend in the measured performance of the subject ICU between a previous timeframe and the predefined period of time.

9. The non-transitory computer-readable media of claim 8, wherein the graphical objects are arrows, and wherein an orientation of the arrows indicate an amount of change in the measured performance of the subject ICU with respect to the third metric, the fourth metric, and the fifth metric, respectively.

10. The non-transitory computer-readable media of claim 1, wherein the method further comprises:
receiving a user-initiated selection within the first data strip;
rendering a pop-up graph in a display area that overlays a portion of the graphic, wherein the pop-up graph includes a first data point that visually indicates the performance of the subject ICU with respect to the third metric during the predefined period of time.

11. The non-transitory computer-readable media of claim 10, wherein rendering a pop-up graph further comprises:
placing a second data point on the pop-up graph, wherein a location of the second data point represents the performance of the subject ICU with respect to the third metric during a timeframe prior to the predefined period of time; and
connecting the first data point and the second data point to form a line graph.

12. The non-transitory computer-readable media of claim 11, wherein the predefined period of time encompasses a most recent quarter-year period and the prior timeframe encompasses a precedent quarter-year period.

13. The non-transitory computer-readable media of claim 12, wherein the line graph includes four data points that correspond to the most recent quarter-year period and three preceding quarter-year periods, respectively, and wherein an X-axis of the pop-up graph indicates the quarter-year period that corresponds to each of the four data points.

14. A computer system for automatically generating a graphic that facilitates assessment of a subject intensive care unit (ICU) with respect to a plurality of care-evaluation metrics, the computer system comprising a processor coupled to a computer-readable medium, the computer readable medium having stored thereon a plurality of computer software components executable by the processor, the computer software components comprising:
an obtaining component to obtain a mortality rate of the subject ICU over a predefined period of time and to obtain a mean length of stay in the subject ICU over the predefined period of time;

a predictive component to perform a derivation process that calculates predicted values used for evaluating operation of the subject ICU, wherein the derivation process comprises:
  (a) generating a predicted value of mortality rate utilizing historical medical records collected from a plurality of ICUs other than the subject ICU, wherein the mortality-rate predicted value represents a benchmark mortality rate for an ICU;
  (b) generating a predicted value of a length of stay in an ICU utilizing historical medical records collected from the plurality of other ICUs, wherein the length-of-stay predicted value represents a benchmark duration of time an average patient stays in an ICU before being discharged;

a rendering component to:
  (a) construct a two-dimensional graph that includes an X-axis and a Y-axis, wherein the X-axis represents a ration of the predicted mortality rate value of the plurality of ICUs over the measured mortality rate value of the subject ICU and the Y-axis represents a difference between the predicted mean length of stay value of the plurality of ICUs and the measured mean length of stay value of the subject ICU;
  (b) place at a location on the two-dimensional graph a data point that visually indicates the subject ICU's current performance with respect to the mortality rate and the mean length of stay during the predefined period of time; and
  (c) present a representation of a ninety-five percent confidence interval being displayed as an ellipse about an intersection of the X-axis and the Y-axis on the two-dimensional graph, wherein the ninety-five percent confidence interval indicates whether a difference between the measured performance and the predicted values of the subject ICU is statistically significant.

15. The computer system of claim 14, wherein the obtaining component is further configured to measure a performance of the subject ICU with respect to a specific metric, wherein the location of the data point on the 2-dimensional plot is affected, in part, by the performance of the subject ICU measured against the specific metric.

16. The computer system of claim 15, wherein the rendering component is further configured to render a graphic that includes the 2-dimensional graph positioned adjacent to at least one data strip, wherein a length of the at least one data strip visually indicates the performance of the subject ICU with respect to the specific metric.

17. The computer system of claim 14, wherein, upon receiving a user-initiated selection at the 2-dimensional graph, the rendering component is further configured to present a pop-up graph in a display area that overlays a portion of the graphic, wherein the pop-up graph depicts a scatter plot that includes the data point and a plurality of prior data points that visually indicate a performance of the subject ICU during precedent timeframes.

18. One or more non-transitory computer-readable memory having computer-executable instructions embodied thereon to render on one or more display devices a user interface (UI) display, the UI display being configured to present a graphical that provides an aggregate view of performance measurements for a subject intensive care unit (ICU), the graphic comprising:
  a first display area that includes a first data strip, wherein the length of the first data strip visually represents a percentage of patients that did not receive active treatment upon being admitted to the subject ICU;
  a second display area that includes a second data strip, wherein the length of the second data strip visually represents a rate at which patients released from the subject ICU are readmitted to an ICU during the patients' stay at a hospital;
  a third display area that includes a third data strip, wherein the length of the third data strip visually represents a median of the acute physiological scores (APS's) calculated from each of the patients admitted to the subject ICU during a predefined period of time; and
  a fourth display area that includes a two-dimensional graph, wherein increments on the X-axis signify a ratio of the predicted mortality rate value over the measured mortality rate, wherein increments on the Y-axis signify a difference between the predicted mean length of stay value and the measured mean length of stay value, wherein the predicted mortality rate and the predicted length of stay are benchmark values derived from historical medical records produced by a plurality of remote hospitals, wherein at least one data point is plotted on the two-dimensional graph that visually indicates the subject ICU's current performance with respect to the mortality rate and the mean length of stay during the predefined period of time, and wherein a ninety-five percent confidence interval is plotted about an intersection of the X-axis and the Y-axis on the two-dimensional graph, the confidence interval indicating whether a difference between a measured performance and the predicted values of the subject ICU is statistically significant, the confidence interval being displayed as an ellipse such that the first display area, the second display area, the third display area, and the fourth display area together expose a measured performance of the subject ICU in relation to predicted values of performance for a population of ICUs.

* * * * *